United States Patent
Zewail et al.

(10) Patent No.: US 11,963,239 B2
(45) Date of Patent: Apr. 16, 2024

(54) DATA INDICATOR AND REDUNDANCY VERSION FOR INVALID PXSCHS IN MULTI-PXSCH GRANTS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Jae Ho Ryu, San Diego, CA (US); Xiaoxia Zhang, San Diego, CA (US); Tao Luo, San Diego, CA (US); Qingjiang Tian, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/065,268

(22) Filed: Dec. 13, 2022

(65) Prior Publication Data
US 2023/0116687 A1    Apr. 13, 2023

Related U.S. Application Data

(63) Continuation of application No. 17/805,386, filed on Jun. 3, 2022, now Pat. No. 11,553,537.
(Continued)

(51) Int. Cl.
*H04W 74/08*    (2009.01)
*H04L 1/1812*    (2023.01)
(Continued)

(52) U.S. Cl.
CPC ....... *H04W 74/0858* (2013.01); *H04L 1/1819* (2013.01); *H04W 72/0446* (2013.01); *H04W 72/0453* (2013.01); *H04W 72/23* (2023.01)

(58) Field of Classification Search
CPC ............. H04W 74/0858; H04W 72/23; H04W 72/0446; H04W 72/0453; H04L 1/1819
See application file for complete search history.

(56) References Cited

U.S. PATENT DOCUMENTS

| 11,553,537 B1 | 1/2023 | Zewail |
| 2021/0144743 A1 | 5/2021 | Rastegardoost et al. |

FOREIGN PATENT DOCUMENTS

| WO | 2016036498 A1 | 3/2016 |

OTHER PUBLICATIONS

International Search Report and Written Opinion—PCT/US2022/077142—ISA/EPO—dated Jan. 17, 2023.
(Continued)

*Primary Examiner* — Melvin C Marcelo
(74) *Attorney, Agent, or Firm* — Patterson & Sheridan, L.L.P.

(57) ABSTRACT

Aspects of the present disclosure relate to wireless communications, and more particularly, to techniques for signaling a new data indicator (NDI) and/or redundancy version (RV) for physical uplink/downlink shared channel (PxSCH) transmissions scheduled by a multi-PxSCH downlink control information (DCI) grant. In some cases, these techniques may be used even when a scheduled PxSCH transmission is invalid. In some cases, a number of bits in an NDI field of the DCI corresponds to a number of PxSCHs scheduled by the multi-PxSCH DCI grant. In some cases, a number of bits in an RV field of the DCI corresponds the number of PxSCHs scheduled by the multi-PxSCH DCI grant.

28 Claims, 11 Drawing Sheets

| 8-bit NDI Field | NDI 0 | NDI 1 | NDI 2 | NDI 3 | NDI 4 | NDI 5 | NDI 6 | NDI 7 |
|---|---|---|---|---|---|---|---|---|
| | Corresponds to PDSCH 0 | Corresponds to PDSCH 1 | Corresponds to PDSCH 2 | Corresponds to PDSCH 3 | Corresponds to PDSCH 4 | Corresponds to PDSCH 5 | Corresponds to PDSCH 6 | Corresponds to PDSCH 7 |
| | | | INVALID-- Ignore | | | INVALID-- Ignore | | |

600A

US 11,963,239 B2

Page 2

Related U.S. Application Data

(60) Provisional application No. 63/254,853, filed on Oct. 12, 2021.

(51) Int. Cl.
*H04W 72/0446* (2023.01)
*H04W 72/0453* (2023.01)
*H04W 72/23* (2023.01)
*H04W 74/0833* (2024.01)

(56) References Cited

OTHER PUBLICATIONS

LG Electronics: "PDSCH/PUSCH Enhancements to Support NR Above 52.6 GHz", 3GPP TSG RAN WG1 #106bis-e, R1-2109965, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, 29 Pages, XP052058902.
Samsung: "PDSCH/PUSCH Enhancements for NR From 52.6 GHz to 71 GHz", R1-2109480, 3GPP TSG RAN WG1 #106bis-e, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 22 Pages, XP052058426.
Nokia Siemens Networks, "Remaining Issues on RV Signaling for HARQ", Tdoc R1-080328, 3GPP TSG-RAN Working Group 1#51bis, Jan. 14-18, 2008, pp. 1-5, (Year: 2008).

| 600A → 8-bit NDI Field | NDI 0 | NDI 1 | NDI 2 | NDI 3 | NDI 4 | NDI 5 | NDI 6 | NDI 7 |
|---|---|---|---|---|---|---|---|---|
| | Corresponds to PDSCH 0 | Corresponds to PDSCH 1 | Corresponds to PDSCH 2 INVALID-- Ignore | Corresponds to PDSCH 3 | Corresponds to PDSCH 4 | Corresponds to PDSCH 5 INVALID-- Ignore | Corresponds to PDSCH 6 | Corresponds to PDSCH 7 |

*FIG. 6A*

| 600B → 8-bit RV Field | RV 0 | RV 1 | RV 2 | RV 3 | RV 4 | RV 5 | RV 6 | RV 7 |
|---|---|---|---|---|---|---|---|---|
| | Corresponds to PDSCH 0 | Corresponds to PDSCH 1 | Corresponds to PDSCH 2 INVALID-- Ignore | Corresponds to PDSCH 3 | Corresponds to PDSCH 4 | Corresponds to PDSCH 5 INVALID-- Ignore | Corresponds to PDSCH 6 | Corresponds to PDSCH 7 |

| 8-bit NDI Field | NDI 0 | NDI 1 | NDI 3 | NDI 4 | NDI 6 | NDI 7 | NDI 2 | NDI 5 |
|---|---|---|---|---|---|---|---|---|
| | NDI to be Applied to Valid PDSCHs ||||||Corresponds to Invalid PDSCH Scheduled in Slot 2 | Corresponds to Invalid PDSCH Scheduled in Slot 5 |

| 8-bit RV Field | RV 0 | RV 1 | RV 3 | RV 4 | RV 6 | RV 7 | RV 2 | RV 5 |
|---|---|---|---|---|---|---|---|---|
| | RV to be Applied to Valid PDSCHs ||||||Corresponds to Invalid PDSCH Scheduled in Slot 2 | Corresponds to Invalid PDSCH Scheduled in Slot 5 |

A METHOD FOR WIRELESS COMMUNICATION BY A USER EQUIPMENT (UE)

802

RECEIVE A DOWNLINK CONTROL INFORMATION (DCI) MESSAGE SCHEDULING A PLURALITY OF TRANSMISSIONS IN A PLURALITY OF DIFFERENT SLOTS, WHEREIN:

(1)  A FIRST SET OF TRANSMISSIONS OF THE PLURALITY OF TRANSMISSIONS IN A FIRST SET OF SLOTS OF THE PLURALITY OF DIFFERENT SLOTS COLLIDE WITH A CORRESPONDING SECOND SET OF TRANSMISSIONS PREVIOUSLY SCHEDULED WITHIN THE FIRST SET OF SLOTS, (2)  THE DCI MESSAGE INCLUDES AT LEAST A FIRST FIELD COMPRISING A FIRST PLURALITY OF VALUES, (3)  EACH DIFFERENT VALUE IN THE FIRST PLURALITY OF VALUES CORRESPONDS TO A DIFFERENT TRANSMISSION IN THE PLURALITY OF TRANSMISSIONS, AND (4)  A NUMBER OF VALUES OF THE FIRST PLURALITY OF VALUES IS EQUAL TO A NUMBER OF TRANSMISSIONS IN THE PLURALITY OF TRANSMISSIONS; AND

804

COMMUNICATE A THIRD SET OF TRANSMISSIONS OF THE PLURALITY OF TRANSMISSIONS THAT DO NOT COLLIDE WITH THE SECOND SET OF TRANSMISSIONS PREVIOUSLY SCHEDULED WITHIN THE FIRST SET OF SLOTS

TRANSMIT A DOWNLINK CONTROL INFORMATION (DCI) MESSAGE SCHEDULING A PLURALITY OF TRANSMISSIONS IN A PLURALITY OF DIFFERENT SLOTS, WHEREIN:

(1) A FIRST SET OF TRANSMISSIONS OF THE PLURALITY OF TRANSMISSIONS IN A FIRST SET OF SLOTS OF THE PLURALITY OF DIFFERENT SLOTS COLLIDE WITH A CORRESPONDING SECOND SET OF TRANSMISSIONS PREVIOUSLY SCHEDULED WITHIN THE FIRST SET OF SLOTS, (2) THE DCI MESSAGE INCLUDES AT LEAST A FIRST FIELD COMPRISING A FIRST PLURALITY OF VALUES, (3) EACH DIFFERENT VALUE IN THE FIRST PLURALITY OF VALUES CORRESPONDS TO A DIFFERENT TRANSMISSION IN THE PLURALITY OF TRANSMISSIONS, AND (4) A NUMBER OF VALUES OF THE PLURALITY OF VALUES IS EQUAL TO A NUMBER OF TRANSMISSIONS IN THE FIRST PLURALITY OF TRANSMISSIONS; AND

COMMUNICATE A THIRD SET OF TRANSMISSIONS OF THE PLURALITY OF TRANSMISSIONS THAT DO NOT COLLIDE WITH THE SECOND SET OF TRANSMISSIONS PREVIOUSLY SCHEDULED WITHIN THE FIRST SET OF SLOTS

FIG. 9

DATA INDICATOR AND REDUNDANCY VERSION FOR INVALID PXSCHS IN MULTI-PXSCH GRANTS

CROSS-REFERENCE TO RELATED APPLICATIONS

This present application is a continuation of U.S. patent application Ser. No. 17/805,386, filed on Jun. 3, 2022, which claims priority to and the benefit of U.S. Provisional Application No. 63/254,853, filed Oct. 12, 2021, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for signaling a new data indicator (NDI) and/or redundancy version (RV) for physical uplink/downlink shared channel (PxSCH) transmissions scheduled by a multi-PxSCH grant.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

In one aspect, a method, performed by a user equipment (UE), for wireless communication, includes receiving a downlink control information (DCI) message scheduling a plurality of transmissions in a plurality of different slots, wherein: a first set of transmissions of the plurality of transmissions in a first set of slots of the plurality of different slots collide with a corresponding second set of transmissions previously scheduled within the first set of slots, the DCI message includes at least a first field comprising a first plurality of values, each different value in the first plurality of values corresponds to a different transmission in the plurality of transmissions, and a number of values of the first plurality of values is equal to a number of transmissions in the plurality of transmissions; and communicating a third set of transmissions of the plurality of transmissions that do not collide with the second set of transmissions previously scheduled within the first set of slots.

In one aspect, a method performed by a network entity includes transmitting a downlink control information (DCI) message scheduling a plurality of transmissions in a plurality of different slots, wherein: a first set of transmissions of the plurality of transmissions in a first set of slots of the plurality of different slots collide with a corresponding second set of transmissions previously scheduled within the first set of slots, the DCI message includes at least a first field comprising a first plurality of values, each different value in the first plurality of values corresponds to a different transmission in the plurality of transmissions, and a number of values of the first plurality of values is equal to a number of transmissions in the plurality of transmissions; and communicating a third set of transmissions of the plurality of transmissions that do not collide with the second set of transmissions previously scheduled within the first set of slots.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 6A illustrates a first example of an NDI field according to aspects of the present disclosure.

FIG. 6B illustrates a second example of an NDI field according to aspects of the present disclosure.

FIG. 7A illustrates a first example of an RV field according to aspects of the present disclosure.

FIG. 7B illustrates a second example of an RV field according to aspects of the present disclosure.

FIG. 8 depicts a method for wireless communications.

FIG. 9 depicts a method for wireless communications.

DETAILED DESCRIPTION

A single DCI may schedule multiple PxSCHs. As described herein, PxSCH is used to represent both a physical downlink shared channel (PDSCH) and a physical uplink shared channel (PUSCH). Aspects of the present disclosure provide apparatuses, methods, processing systems, and computer-readable mediums for a multi-PxSCH DCI that signals a new data indication (NDI) and/or redundancy version (RV) for each scheduled PxSCH regardless of whether the PxSCH is valid. A PxSCH may be considered valid when the PxSCH does not collide in time with a previously-scheduled semi-static uplink/downlink transmissions. In some cases, a number of bits of the NDI signaled in the multi-PxSCH DCI may correspond to the number of PxSCHs (e.g., PDSCHs or PUSCHs) scheduled by the multi-PxSCH DCI. Similarly, a number of bits of the RV signaled in the multi-PxSCH DCI may correspond to the number of PxSCHs (e.g., PDSCHs or PUSCHs) scheduled by the multi-PxSCH DCI.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
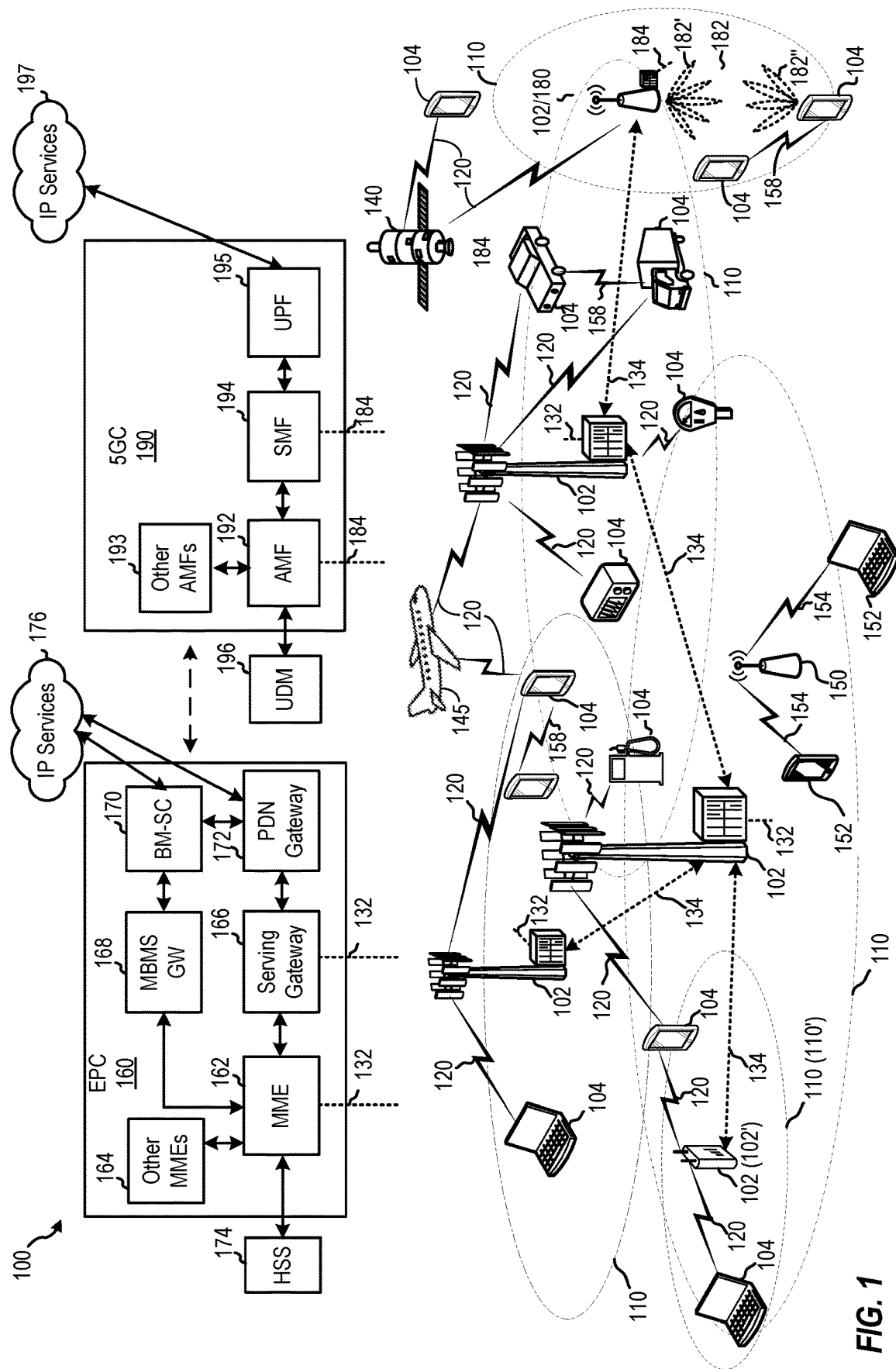
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
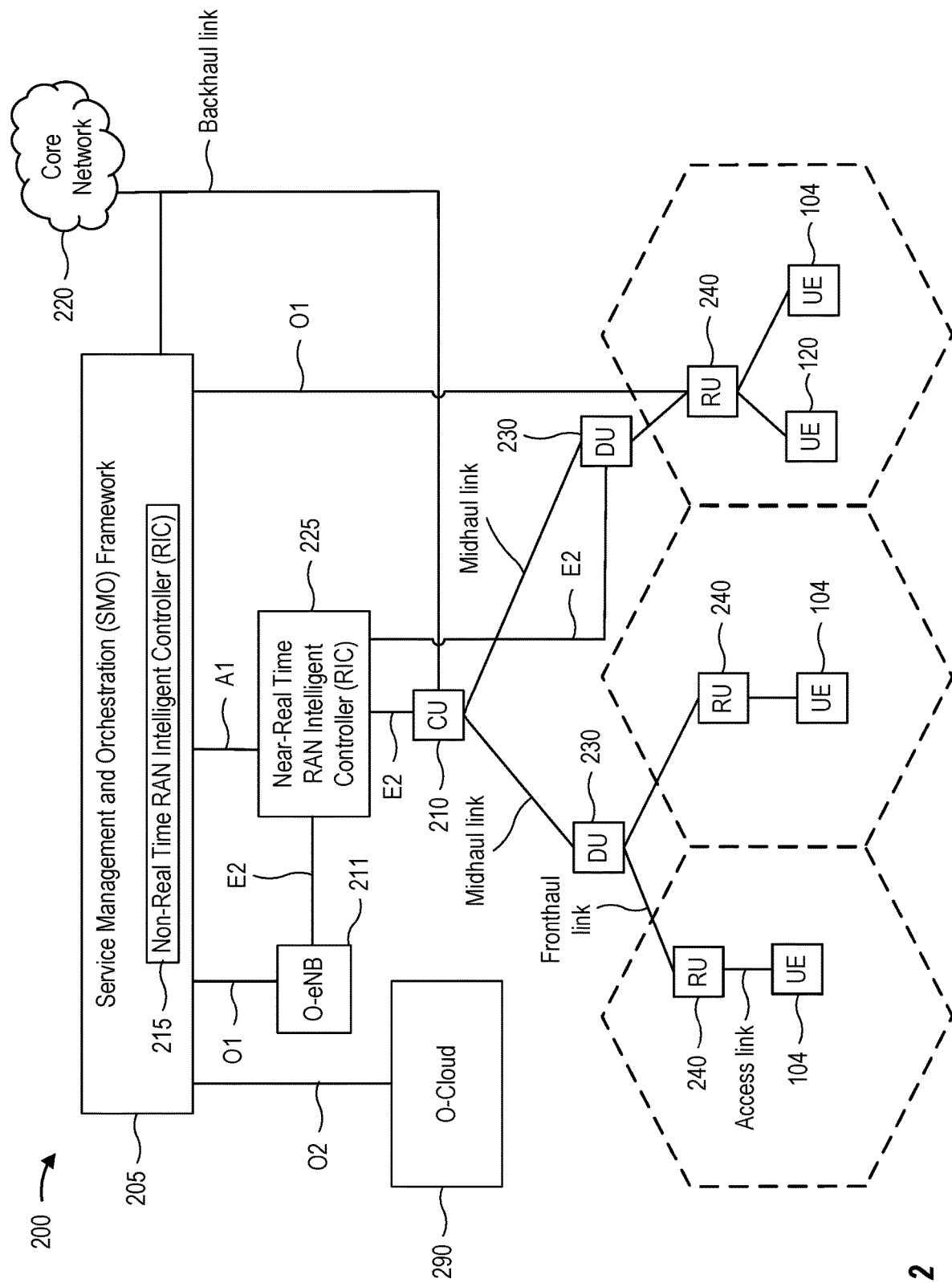
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
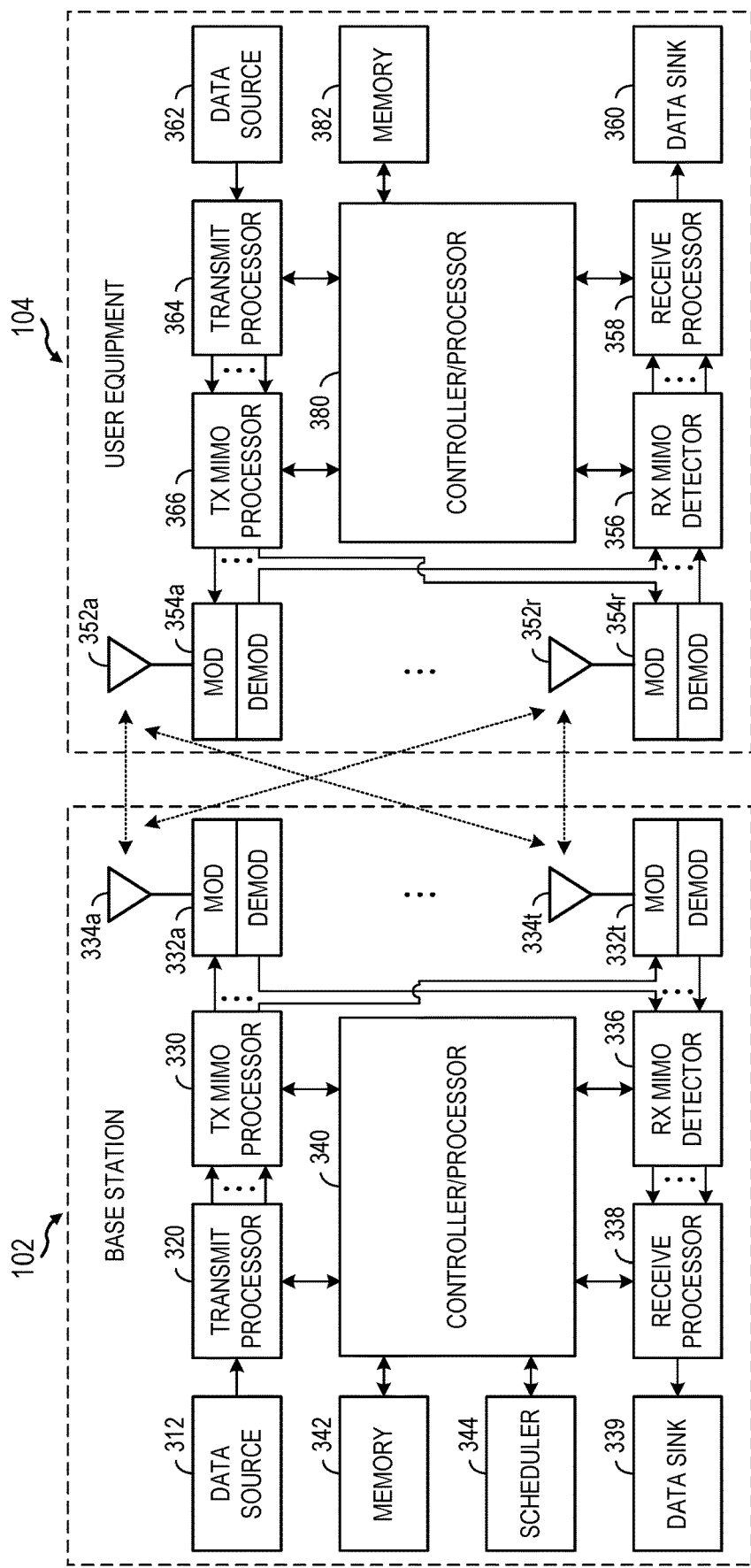
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
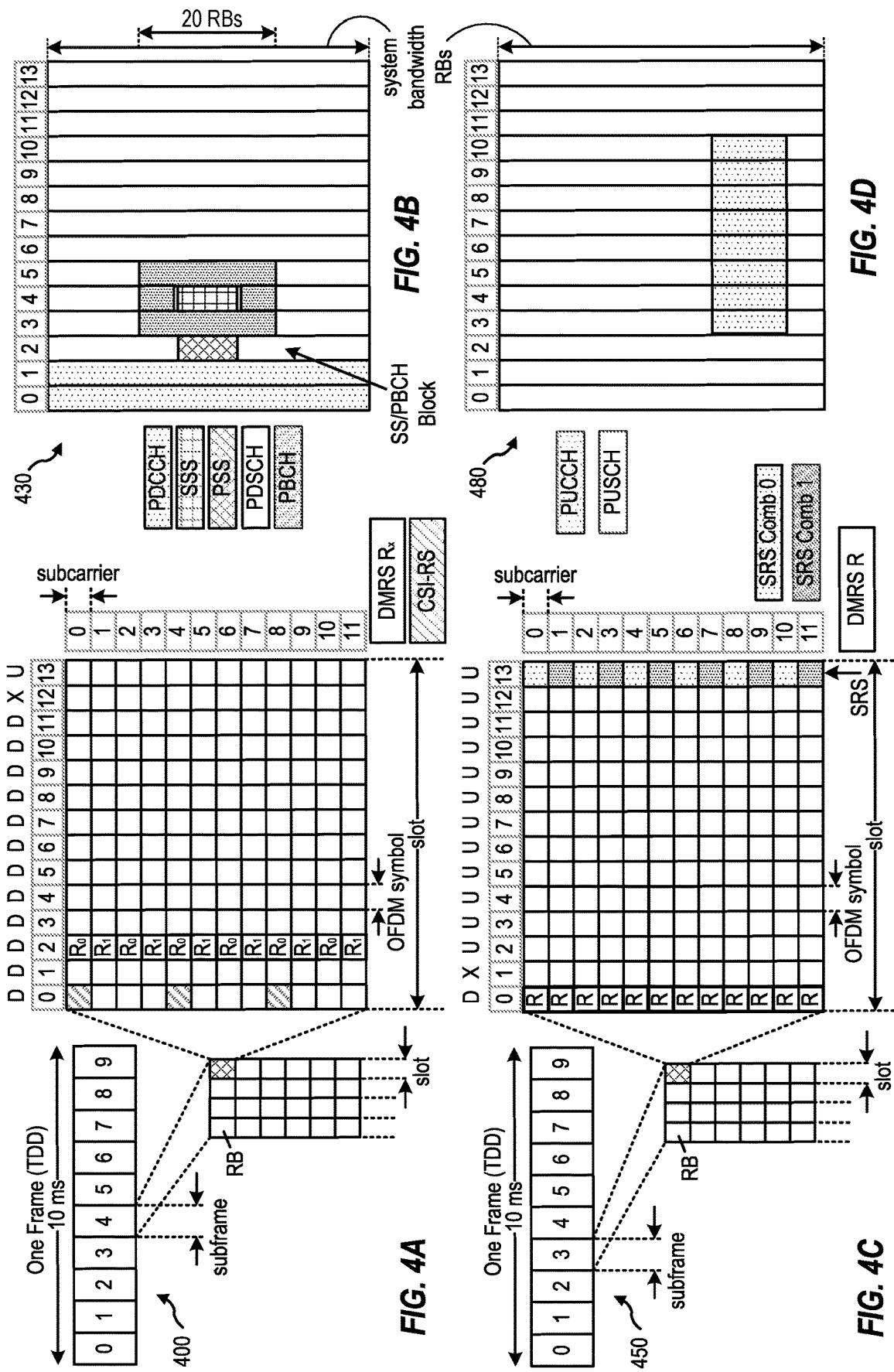
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 $\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to NDI and RV for Invalid PxSCHs in Multi-PxSCH Grants

Current agreements support multi-downlink (DL) or multi-uplink (UL) resource allocation by a single downlink control information (DCI) message. These multi-DL or multi-UL transmissions may generally be referred to as a multi-PxSCH transmission, wherein PxSCH refers to either a physical downlink shared channel (PDSCH) or a physical uplink shared channel (PUSCH). In some cases, a multi-PxSCH scheduling DCI includes, at least, the following fields: a time domain resource allocation (TDRA) field, a modulation and coding scheme (MCS), a new data indicator (NDI), a redundancy version (RV), and a hybrid automatic repeat request (HARQ) process number. In some cases, in the context of a PDSCH transmission, the scheduling DCI may include a respective MCS, NDI, and RV for each transport block (TB) of the PDSCH transmission.

The TDRA field indicates time domain resources for multiple PxSCHs (e.g., multiple PDSCHs or multiple PUSCHs). In some cases, a number of scheduled PxSCHs may be implicitly indicated to a UE by a number of valid separate start and length indicator vectors (SLIVs). In an example, the TDRA includes an index value that points to an index in a TDRA table. In an example, the TDRA index value ranges between 0-15. In some cases, a row corresponding to the TDRA index value indicates a single SLIV or multiple SLIVs. Each scheduled PxSCH may have a separate SLIV per time domain resources.

In an example, for a DCI that schedules multiple PDSCHs, a modulation and coding scheme (MCS) for the first TB appears only once in the DCI and may be applicable to the first TB of each scheduled PDSCH. Additionally, in some cases, the NDI for the first TB may be signaled per PDSCH and is applicable to the first TB of each PDSCH. The NDI may indicates whether a PDSCH is for a new transmission or a retransmission.

The RV for the first TB may be signaled per PDSCH. In some cases, the RV may be signaled using two bits when only a single PDSCH is scheduled or using one bit for each PDSCH otherwise. The RV for the first TB may apply to the first TB of each scheduled PDSCH. In an example, the RV may be set to not change during a HARQ process.

The HARQ process number refers to the unique identifier for each HARQ process. The HARQ process number signaled in the DCI may be applicable to the first scheduled PDSCH and is incremented by one for subsequent PDSCHs (e.g., using a modulo operation, if needed).

While the techniques described above relate to a specific example of the PxSCH being a PDSCH, in some cases the PxSCH may be a PUSCH. In such cases, the fields of a multi-PUSCH DCI include an MCS for a PUSCH TB, an NDI for the TB, an RV for the TB, and a HARQ process number, wherein the fields correspond to PUSCH transmissions.

As described above, a DCI may schedule multiple PDSCHs or PUSCHs. Some instances of the scheduled PDSCHs or PUSCHs may overlap in time with previously-scheduled transmissions. When a PDSCH is scheduled at the same time as UL transmissions, the overlapping PDSCH may be considered invalid and may be dropped. Similarly, when a PUSCH is scheduled at the same time as a DL transmission, the PUSCH may be considered invalid and may be dropped. Currently, it has been agreed that if a scheduled PDSCH or PUSCH is dropped due to collision with a prior scheduled UL or DL symbol(s), respectively, incrementing the HARQ process number may be skipped for the dropped/discarded (or invalid) PDSCH or PUSCH and applied only for valid (e.g., non overlapping) PDSCH(s)/PUSCH(s) transmissions. In an example, the scheduled PDSCH/PUSCH may be indicated by tdd-UL-DL-ConfigurationCommon or tdd-UL-DL-ConfigurationDedicated.

In view of this agreement, and with reference to the DCI fields described above, the HARQ process ID may be signaled in a multi-PDSCH scheduling DCI for a PDSCH TB scheduled by the multi-PDSCH DCI and may be incremented for valid PDSCHs only (e.g., PDSCHs that to not conflict or overlap in time with semi-static UL transmissions). A similar rule applies for a multi-PUSCH DCI. For example, the HARQ process ID may be signaled in the multi-PUSCH DCI for a first PUSCH scheduled by the multi-PUSCH DCI and may be incremented for the valid PUSCHs only (e.g., PUSCHs that to not conflict or overlap in time with DL transmissions).

While the HARQ process may be agreed upon (e.g., incrementing the HARQ process ID number only for valid PUSCHs/PDSCHs), it is not clear how to handle the signaling of NDI and RV in the case of an invalid PDSCH or PUSCH, which may lead to certain negative effects. For example, when an invalid PDSCH or PUSCH occurs, this PDSCH or PUSCH may be dropped from transmission. In this case, if an NDI or RV for a remaining PDSCH or PUSCH transmission (e.g., of a multi-PDSCH transmission or a multi-PUSCH transmission) is not properly signaled, this may lead to the remaining PDSCH or PUSCH transmission not being properly received or decoded, wasting time and frequency resources used for communication within a wireless network (e.g., wireless communication network 100 of FIG. 1). In such cases, the PDSCH or PUSCH transmission may need to be retransmitted, which may unnecessarily consume additional time and frequency resources for communication within the wireless network as well as consuming additional power resources at a device performing the retransmission.

Accordingly, aspects of the present disclosure provide techniques for signaling an NDI and/or RV for PxSCH transmissions scheduled by a multi-PxSCH grant. In some cases, these techniques may be used to signal an NDI and/or RV regardless of whether a corresponding PxSCH is valid or invalid. In some cases, the techniques presented herein may help to avoid scenarios in which an NDI and/or RV associated with PxSCHs are improperly signaled, thereby reducing improperly received/decoded transmissions. By reducing improperly received/decoded transmissions due to improperly signaled NDI and/or RV, time and frequency resources within the wireless network as well as power resources of devices within the wireless network may be conserved (e.g., not wasted).

Accordingly, in some cases, a network entity (e.g., BS 102 illustrated in FIGS. 1 and 3 and/or a disaggregated base station as described with respect to FIG. 2) may transmit a DCI to a UE (e.g., UE 104 illustrated in FIGS. 1 and 3), which may include or signal an NDI and/or RV per PxSCH scheduled by the DCI. In other words, the NDI and RV may be signaled per SLIV indicated by the DCI. Regardless of whether a PxSCH is valid or not, the DCI may include a respective single NDI bit and a respective single RV bit for each scheduled PxSCH/SLIV. In some cases, the respective NDI bit for each scheduled PxSCH/SLIV may be included within an NDI field within the DCI. In other words, the NDI field may include a plurality of NDI bits, each different NDI bit corresponding to a different scheduled PxSCH/SLIV. Similarly, the respective RV bit for each scheduled PxSCH/SLIV may be included within an RV field within the DCI. In other words, the RV field may include a plurality of RV bits, each different RV bit corresponding to a different scheduled PxSCH/SLIV.

In some cases, when a PDSCH is dropped due to an overlap with semi-static UL symbols or when an PUSCH is dropped due to overlap with previously-scheduled DL symbols, the UE may ignore the respective NDI bit and respective RV bit in the DCI that corresponds to the dropped (e.g., invalid) PxSCH transmission. In some cases, a single respective NDI bit and a single respective RV bit corresponding to each scheduled PxSCH may be efficient way for the UE to associate each NDI bit and RV bit with a PxSCH/SLIV, decide which PxSCHs/SLIVs are valid and/or invalid, and ignore NDI bits and RV bits in the DCI that correspond to invalid PxSCHs/SLIVs.

As noted, in some cases, the UE may determine whether a PxSCH is valid or invalid based on the DCI received from the network node. In an example, for a multi-PDSCH grant (e.g., the DCI schedules multiple PDSCHs), the UE may determine whether there is an overlap in time between a scheduled PDSCH (e.g., as indicated by a slot offset and one or more TDRAs in the DCI corresponding to one or more SLIVs (e.g., k0 for PDSCH and k2 for PUSCH)) and a semi-static UL transmission. In an example, an overlap in time indicates the scheduled PDSCH transmission overlaps, conflicts, or collides with a UL transmission. Similarly, for a multi-PUSCH grant, an overlap in time between a scheduled PUSCH transmission and a previously-scheduled DL transmission indicates that the scheduled PUSCH transmission overlaps, conflicts, or collides with the previously-scheduled DL transmission.

In some cases, to help determine which NDI bits and RV bits to ignore within the DCI when certain scheduled PxSCH transmissions are invalid, NDI bits within the NDI field and RV bits within the RV field may be ordered according to different examples, such as Example 1 and Example 2 described below.

Example 1: In some cases, positions (e.g., ordering) of NDI bits within the NDI field of the DCI and positions of RV bits (e.g., ordering) within the RV field of the DCI correspond to an order of SLIVs (e.g., of the scheduled PxSCHs in the DCI) in the time domain, regardless of whether an SLIV or corresponding PxSCH is valid or invalid. Accordingly, to determine which NDI bits and RV bits are invalid and thus may be ignored, the UE may first determine which PxSCHs are invalid (e.g., overlap with another transmission). Thereafter, because the positions of bits within the NDI field and positions of bits within the RV field correspond to the order of SLIVs of the scheduled PxSCHs within the DCI, the UE may then correlate the positions of bits within the NDI field and the positions of the bits within the RV field of the DCI to the invalid PxSCHs based on the SLIVs corresponding to these invalid PxSCHs and the order of the SLIVs. The UE may then ignore the NDI and RV bits/values within the NDI and RV fields associated with invalid (e.g., overlapping, conflicting, or colliding) PxSCH transmissions.

Example 2: In some cases, the positions (e.g., ordering) of bits within the NDI field may be based on the order of valid SLIVs in the time domain, followed by bits corresponding to invalid SLIVs. Similarly, the positions of bits within the RV field is based on the order of valid SLIVs in the time domain, followed by bits corresponding to invalid SLIVs.

For illustration purposes, in one example, assume a the DCI transmitted by the network entity to the UE schedules 8 PDSCHs each with (S, L)=(0, 14), where S refers to the starting symbol and L refers to the length, over slots 0 to 7, and the HARQ process number is 2. Further, for illustration purposes, assume that slots 2 and 5 have scheduled semi-static UL transmissions.

Figure 5:
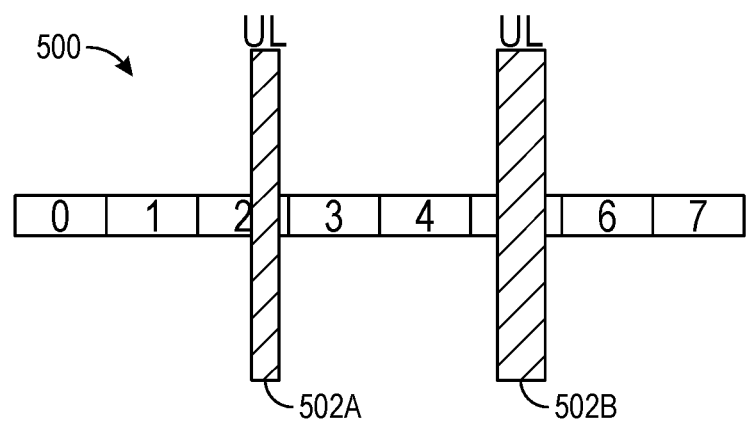
FIG. 5 illustrates a slot format including a plurality of scheduled PDSCHs.

FIG. 5 illustrates a slot format 500 including a plurality of scheduled PDSCHs in a plurality of slots (numbered as slots 0-7). For example, as shown, the slot format 500 includes eight scheduled PDSCHs (numbered as PDSCHs 0-7). As illustrated, UL transmissions 502A and 502B are scheduled during slots 2 and 5, respectively. In this example, the UE may determine the valid scheduled PDSCHs to be the PDSCHs scheduled in slots 0, 1, 3, 4, 6, and 7. Additionally, the UE may determine the invalid scheduled PDSCHs to be the PDSCHs scheduled in slots 2 and 5 due to these PDCHSs overlapping with the UL transmissions 502A and 502B.

Given the HARQ process=2 and that the PDSCHs scheduled in slots 2 and 5 are invalid, the HARQ process IDs will be PDSCH 0=2, PDSCH 1=3, PDSCH 3=4, PDSCH 4=5, PDSCH 6=6, and PDSCH 7=7. This is because the HARQ process ID is not incremented for invalid PDSCH transmissions.

In accordance with Example 1 described above, the NDI field may include an NDI vector of size 8. A number of bits in the NDI field (e.g., 8 bits) corresponds to the number of scheduled PDSCHs (and number of SLIVs indicated in the DCI). Regardless of whether a PDSCH is valid or not, the ordering of the bits in the NDI field corresponds to the scheduled PDSCHs in the time domain. FIG. 6A illustrates an example NDI field 600A having an NDI vector of size 8. As such, the NDI field 600A includes eight NDI bits (numbered NDI 0-7). As shown, an ordering of the NDI bits included within the NDI field 600A may be based on Example 1 described above. As such, NDI 0 corresponds to PDSCH 0 of the slot format 500 illustrated in FIG. 5, NDI 1 corresponds to PDSCH 1, NDI 2 corresponds to PDSCH 2, NDI 3 corresponds to PDSCH 3, NDI 4 corresponds to PDSCH 4, NDI 5 corresponds to PDSCH 5, and so on.

FIG. 6B illustrates an example RV field 600B with an RV vector of size 8, including eight RV bits (numbered RV 0-7). As shown, an ordering of the RV bits included within the RV field 600B may be based on Example 1 described above The number of bits in the RV (e.g., 8) corresponds to the number of scheduled PDSCHs (and number of SLIVs indicated in the DCI). Regardless of whether a PDSCH is valid or not, the ordering of the RV bits in the RV field 600B corresponds to the scheduled PDSCHs in the time domain. As such, in FIG. 6B, RV 0 corresponds to PDSCH 0 of the slot format 500 illustrated in FIG. 5, RV 1 corresponds to PDSCH 1, RV 2 corresponds to PDSCH 2, RV 3 corresponds to PDSCH 3, RV 4 corresponds to PDSCH 4, RV 5 corresponds to PDSCH 5, and so on.

As described above, because the prior scheduled UL transmissions 502A and 502B overlap in time with the scheduled PDSCH 2 and PDSCH 5 illustrated in the slot format 500 in FIG. 5, the UE may determine that PDSCH 2 and PDSCH 5 are invalid. Because the ordering of the bits in each of the NDI field 600A and the RV field 600B correspond to the scheduled PDSCHs (e.g., PDSCH 0-7 in FIG. 5) in the time domain, the UE may discard, drop, or ignore the NDI and RV bits corresponding to PDSCH 2 in slot 2 of the slot format 500 and the NDI and RV bits corresponding to PDSCH 5 in slot 5 of the slot format 500. In this example, the UE may ignore the bits corresponding to NDI 2 and NDI 5 in the NDI field 600A and the bits corresponding to RV 2 and RV 5 in the RV field 600B since they correspond to the invalid PDSCH 2 and invalid PDSCH 5 scheduled in slots 2 and 5, respectively. In other words, in FIGS. 6A and 6B, the UE may ignore NDI 2 and NDI 5 in the NDI field 600A and RV 2 and RV 5 in the RV field 600B.

FIG. 7A illustrates an example NDI field 700A according to Example 2 described above. In accordance with Example 2, the NDI field 700A may still include an NDI vector of size 8. Additionally, the number of NDI bits in the NDI field 700A (e.g., 8) may corresponds to the number of scheduled PDSCHs (and number of SLIVs as indicated in the DCI). As discusses above, in Example 2, NDIs corresponding to valid PDSCHs are ordered first followed by NDIs corresponding to invalid PDSCHs. As such, as illustrated in FIG. 7A, the order of NDI bits in the NDI field 700A is NDI 0, NDI 1, NDI 3, NDI 4, NDI 6, NDI 7 (each of which corresponds to a valid PDSCH in the slot format 500 of FIG. 5) followed by NDI 2 and NDI 5 (which correspond to invalid PDSCH 2 and PDSCH 5 in slots 2 and 5 of the slot format 500). Accordingly, the UE may ignore, discard, or drop the NDIs corresponding to the invalid PDSCHs scheduled in slots 2 and 5. In other words, the UE may ignore NDI 2 and NDI 5 corresponding to invalid PDSCH 2 in slot 2 and invalid PDSCH 5 in slot 5, respectively.

FIG. 7B illustrates an example RV field 700B according to Example 2 described above. In accordance with Example 2, the RV field 700B may still include an RV vector of size 8. Additionally, the number of bits in the RV field 700B (e.g., 8) corresponds to the number of scheduled PDSCHs (and number of SLIVs indicated in the DCI). As discussed above, in Example 2, RVs corresponding to valid PDSCHs are ordered first followed by RVs corresponding to invalid PDSCHs. As such, as illustrated in FIG. 7B, the order of RV bits in the RV field 700B is RV 0, RV 1, RV 3, RV 4, RV 6, RV 7 (each of which corresponds to a valid PDSCH in the slot format 500 of FIG. 5) followed by RV 2 and RV 5 (which correspond to invalid PDSCH 2 and PDSCH 5 in slots 2 and 5 of the slot format 500). Accordingly, the UE may ignore, discard, or drop the RVs corresponding to the invalid PDSCHs scheduled in slots 2 and 5. In other words, the UE may ignore RV 2 and RV 5 corresponding to invalid PDSCH 2 in slot 2 and invalid PDSCH 5 in slot 5, respectively.

Example Operations of a User Equipment

FIG. 8 shows a method 800 for wireless communications by a UE, such as UE 104 of FIGS. 1 and 3.

Method 800 begins in step 810 with the UE receiving a DCI message scheduling a plurality of transmissions in a plurality of different slots, wherein: (1) a first set of transmissions of the plurality of transmissions in a first set of slots of the plurality of different slots collide with a corresponding second set of transmissions previously scheduled within the first set of slots, (2) the DCI message includes at least a first field comprising a first plurality of values, each different value in the first plurality of values corresponds to a different transmission in the plurality of transmissions, and (3) a number of values of the first plurality of values is equal to a number of transmissions in the plurality of transmissions.

In step 820, the UE communicates a third set of transmissions of the plurality of transmissions that do not collide with the second set of transmissions previously scheduled within the first set of slots.

In one example, the DCI messages schedules a plurality of PDSCHs or PUSCHs in a plurality of slots. The first set of transmissions may be a set of PDSCHs or PUSCHs that collide with transmissions corresponding to a second set previously scheduled UL/DL transmissions. The DCI message includes at least a first field, e.g., an NDI field comprising a first plurality of values. Each value in the NDI field corresponds to a different PDSCH/PUSCH scheduled by the DCI. Notably, the number of values in the NDI field equal the number of scheduled PDSCH/PUSCH transmissions. The UE receives the PDSCH or transmits a PUSCH scheduled by the DCI that do not collide with the previously scheduled UL/DL transmissions.

In some cases, the DCI message includes at least a second field comprising a second plurality of values. In some cases, each different value in the second plurality of values corresponds to a different transmission in the plurality of transmissions. In some cases, a number of values of the second plurality of values is equal to the number of transmissions in the plurality of transmissions.

In some cases, the first field comprises a new data indicator (NDI) field and the second field comprises a redundancy version (RV) field. In some cases, the first plurality of values comprises a plurality of different NDI values, each different NDI value corresponding to a different transmission in the plurality of transmissions. In some cases, the second plurality of values comprises a plurality of different RV values, each different RV value corresponding to a different transmission in the plurality of transmissions.

In some cases, method 800 further includes determining a first set of different NDI values from the plurality of different NDI values corresponding to the third set of transmissions that do not collide with the second set of transmissions previously scheduled within the first set of slots. In some cases, method 800 further includes determining a second set of different NDI values from the plurality of different NDI values corresponding to the first set of transmissions that collide with the second set of transmissions previously scheduled within the first set of slots. In some cases, method 800 further includes determining a third set of different RV values from the plurality of different RV values corresponding to the third set of transmissions that do not collide with the second set of transmissions previously scheduled within the first set of slots. In some cases, method 800 further includes determining a fourth set of different RV values from the plurality of different RV values corresponding to the first set of transmissions that collide with the second set of transmissions previously scheduled within the first set of slots.

In some cases, communicating the third set of transmissions in step 820 includes using the first set of different NDI values and the third set of different RV values to communicate the third set of transmissions. Additionally, in some cases, communicating the third set of transmissions in step 820 includes discarding the second set of different NDI values and the fourth set of different RV values corresponding to the first set of transmissions that collide with the second set of transmissions previously scheduled within the first set of slots. In this manner, the UE uses valid NDI and RV values.

In some cases, determining the first set of different NDI values and the second set of different NDI values depends on bit positions of the different NDI values of the plurality of different NDI values within the NDI field. In some cases, the bit positions of the different NDI values within the NDI field are based on the first set of transmissions of the plurality of transmissions that collide with the corresponding second set of transmissions.

In some cases, in accordance with Example 2 described above, the bit positions, within the NDI field, of the different NDI values corresponding to the first set of transmissions of the plurality of transmissions occur after the bit positions, within the NDI field, of the different NDI values corresponding to the third set of transmissions of the plurality of transmissions. In some cases, the first set of different NDI values include the different NDI values within the bit positions of the NDI field corresponding to the third set of transmissions of the plurality of transmissions. Additionally, in some cases, the second set of different NDI values include the different NDI values within the bit positions of the NDI field corresponding to the first set of transmissions of the plurality of transmissions.

In some cases, in accordance with Example 1 described above, bit positions, within the NDI field, of the different NDI values corresponding to the first set of transmissions of the plurality of transmissions and the third set of transmissions of the plurality of transmissions occur in numerical order of the plurality of transmissions. In some cases, the first set of different NDI values include the different NDI values within the bit positions of the NDI field corresponding to the third set of transmissions of the plurality of transmissions. Additionally, in some cases, the second set of different NDI values include the different NDI values within the bit positions of the NDI field corresponding to the first set of transmissions of the plurality of transmissions.

A similar process applies to the RV field. Accordingly, in some cases, determining the third set of different RV values and the fourth set of different RV values depends on bit positions of the different RV values of the plurality of different RV values within the RV field. In some cases, the bit positions of the different RV values within the RV field are based on the first set of transmissions of the plurality of transmissions that collide with the corresponding second set of transmissions.

In some cases, in accordance with Example 2 described above, the bit positions, within the RV field, of the different RV values corresponding to the first set of transmissions of the plurality of transmissions occur after the bit positions, within the RV field, of the different RV values corresponding to the third set of transmissions of the plurality of transmissions. In some cases, the third set of different RV values include the different RV values within the bit positions of the RV field corresponding to the third set of transmissions of the plurality of transmissions. Additionally, in some cases, the fourth set of different RV values include the different RV values within the bit positions of the RV field corresponding to the first set of transmissions of the plurality of transmissions.

In some cases, in accordance with Example 1 described above, bit positions, within the RV field, of the different RV values corresponding to the first set of transmissions of the plurality of transmissions and the third set of transmissions of the plurality of transmissions occur in numerical order of the plurality of transmissions. In some cases, the third set of different RV values include the different RV values within the bit positions of the RV field corresponding to the third set of transmissions of the plurality of transmissions. Additionally, in some cases, the fourth set of different RV values include the different RV values within the bit positions of the RV field corresponding to the first set of transmissions of the plurality of transmissions.

Figure 10:
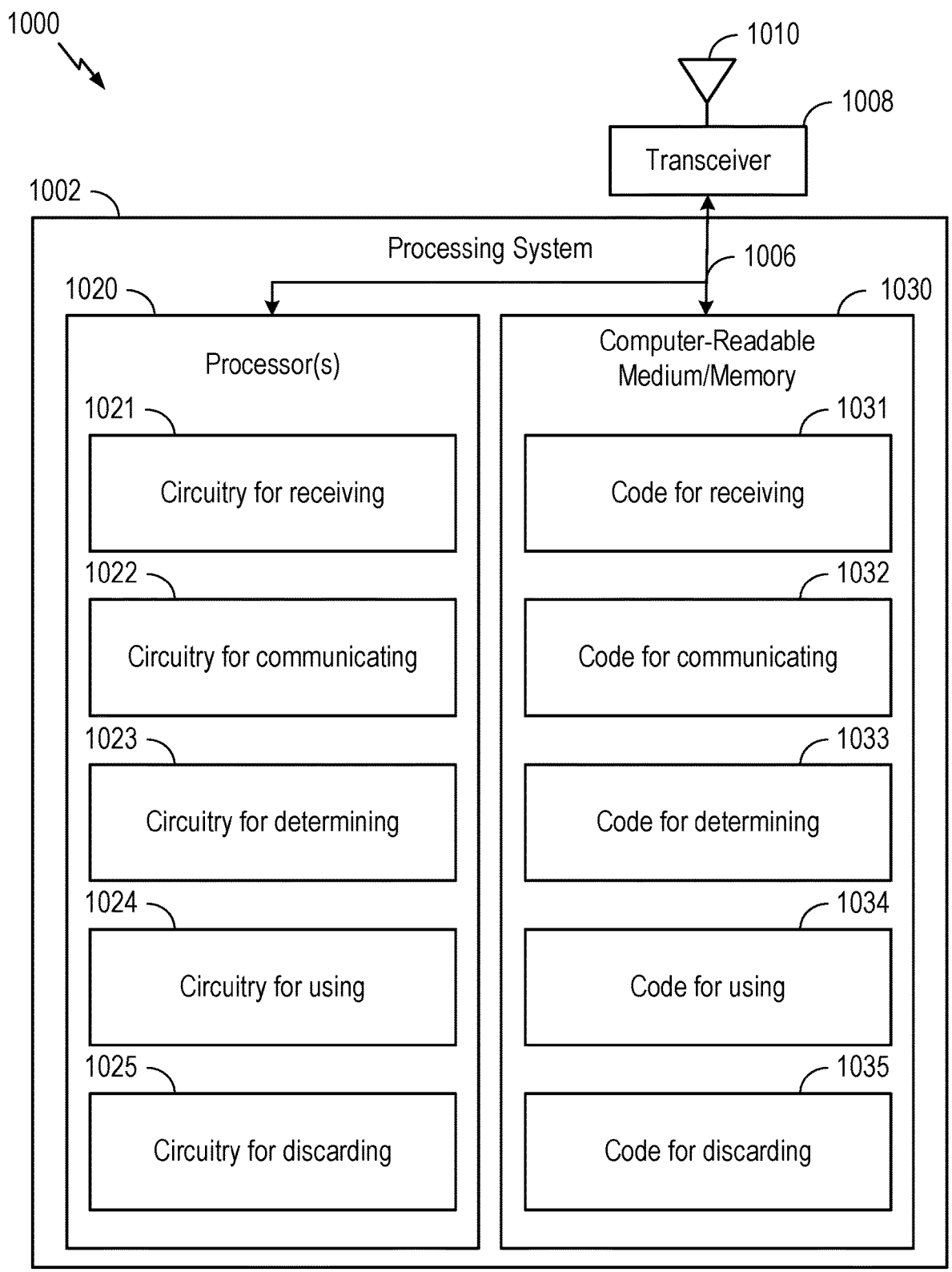
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Network Entity

FIG. 9 shows a method 900 for wireless communications by a network entity, such as BS 102 of FIGS. 1 and 3, or a disaggregated base station as discussed with respect to FIG. 2. The method 900 includes steps corresponding to the method 800.

Method 900 begins in step 910 with the network entity transmitting a DCI message scheduling a plurality of transmissions in a plurality of different slots, wherein: (1) a first set of transmissions of the plurality of transmissions in a first set of slots of the plurality of different slots collide with a corresponding second set of transmissions previously scheduled within the first set of slots, (2) the DCI message includes at least a first field comprising a first plurality of values, each different value in the first plurality of values corresponds to a different transmission in the plurality of transmissions, and (3) a number of values of the first plurality of values is equal to a number of transmissions in the plurality of transmissions.

In step 920, the network entity communicates a third set of transmissions of the plurality of transmissions that do not collide with the second set of transmissions previously scheduled within the first set of slots.

In one example, the DCI messages schedules a plurality of PDSCHs or PUSCHs in a plurality of slots. The first set of transmissions may be a set of PDSCHs or PUSCHs that collide with transmissions corresponding to a second set previously scheduled UL/DL transmissions. The DCI message includes at least a first field, e.g., an NDI field comprising a first plurality of values. Each value in the NDI field corresponds to a different PDSCH/PUSCH scheduled by the DCI. Notably, the number of values in the NDI field equal the number of scheduled PDSCH/PUSCH transmissions. The UE receives the PDSCH or transmits a PUSCH scheduled by the DCI that do not collide with the previously scheduled UL/DL transmissions.

In some cases, the DCI message includes at least a second field comprising a second plurality of values. In some cases, each different value in the second plurality of values corresponds to a different transmission in the plurality of transmissions. In some cases, a number of values of the second plurality of values is equal to the number of transmissions in the plurality of transmissions.

In some cases, the first field comprises a new data indicator (NDI) field and the second field comprises a redundancy version (RV) field. In some cases, the first plurality of values comprises a plurality of different NDI values, each different NDI value corresponding to a different transmission in the plurality of transmissions. In some cases, the second plurality of values comprises a plurality of different RV values, each different RV value corresponding to a different transmission in the plurality of transmissions.

In some cases, method 900 further includes determining a first set of different NDI values from the plurality of different NDI values corresponding to the third set of transmissions that do not collide with the second set of transmissions previously scheduled within the first set of slots. In some cases, method 900 further includes determining a second set of different NDI values from the plurality of different NDI values corresponding to the first set of transmissions that collide with the second set of transmissions previously scheduled within the first set of slots. In some cases, method 900 further includes determining a third set of different RV values from the plurality of different RV values corresponding to the third set of transmissions that do not collide with the second set of transmissions previously scheduled within the first set of slots. In some cases, method 900 further includes determining a fourth set of different RV values from the plurality of different RV values corresponding to the first set of transmissions that collide with the second set of transmissions previously scheduled within the first set of slots.

In some cases, determining the first set of different NDI values and the second set of different NDI values depends on bit positions of the different NDI values of the plurality of different NDI values within the NDI field. In some cases, the bit positions of the different NDI values within the NDI field are based on the first set of transmissions of the plurality of transmissions that collide with the corresponding second set of transmissions.

In some cases, in accordance with Example 2 described above, the bit positions, within the NDI field, of the different NDI values corresponding to the first set of transmissions of the plurality of transmissions occur after the bit positions, within the NDI field, of the different NDI values corresponding to the third set of transmissions of the plurality of transmissions. In some cases, the first set of different NDI values include the different NDI values within the bit positions of the NDI field corresponding to the third set of transmissions of the plurality of transmissions. Additionally, in some cases, the second set of different NDI values include the different NDI values within the bit positions of the NDI field corresponding to the first set of transmissions of the plurality of transmissions.

In some cases, in accordance with Example 1 described above, bit positions, within the NDI field, of the different NDI values corresponding to the first set of transmissions of the plurality of transmissions and the third set of transmissions of the plurality of transmissions occur in numerical order of the plurality of transmissions. In some cases, the first set of different NDI values include the different NDI values within the bit positions of the NDI field corresponding to the third set of transmissions of the plurality of transmissions. Additionally, in some cases, the second set of different NDI values include the different NDI values within the bit positions of the NDI field corresponding to the first set of transmissions of the plurality of transmissions.

A similar process applies to the RV field. For example, in some cases, determining the third set of different RV values and the fourth set of different RV values depends on bit positions of the different RV values of the plurality of different RV values within the RV field. In some cases, the bit positions of the different RV values within the RV field are based on the first set of transmissions of the plurality of transmissions that collide with the corresponding second set of transmissions.

In some cases, in accordance with Example 2 described above, the bit positions, within the RV field, of the different RV values corresponding to the first set of transmissions of the plurality of transmissions occur after the bit positions, within the RV field, of the different RV values corresponding to the third set of transmissions of the plurality of transmissions. In some cases, the third set of different RV values include the different RV values within the bit positions of the RV field corresponding to the third set of transmissions of the plurality of transmissions. Additionally, in some cases, the fourth set of different RV values include the different RV values within the bit positions of the RV field corresponding to the first set of transmissions of the plurality of transmissions.

In some cases, in accordance with Example 1 described above, bit positions, within the RV field, of the different RV values corresponding to the first set of transmissions of the plurality of transmissions and the third set of transmissions of the plurality of transmissions occur in numerical order of the plurality of transmissions. In some cases, the third set of different RV values include the different RV values within the bit positions of the RV field corresponding to the third set of transmissions of the plurality of transmissions. Additionally, in some cases, the fourth set of different RV values include the different RV values within the bit positions of the RV field corresponding to the first set of transmissions of the plurality of transmissions.

Figure 11:
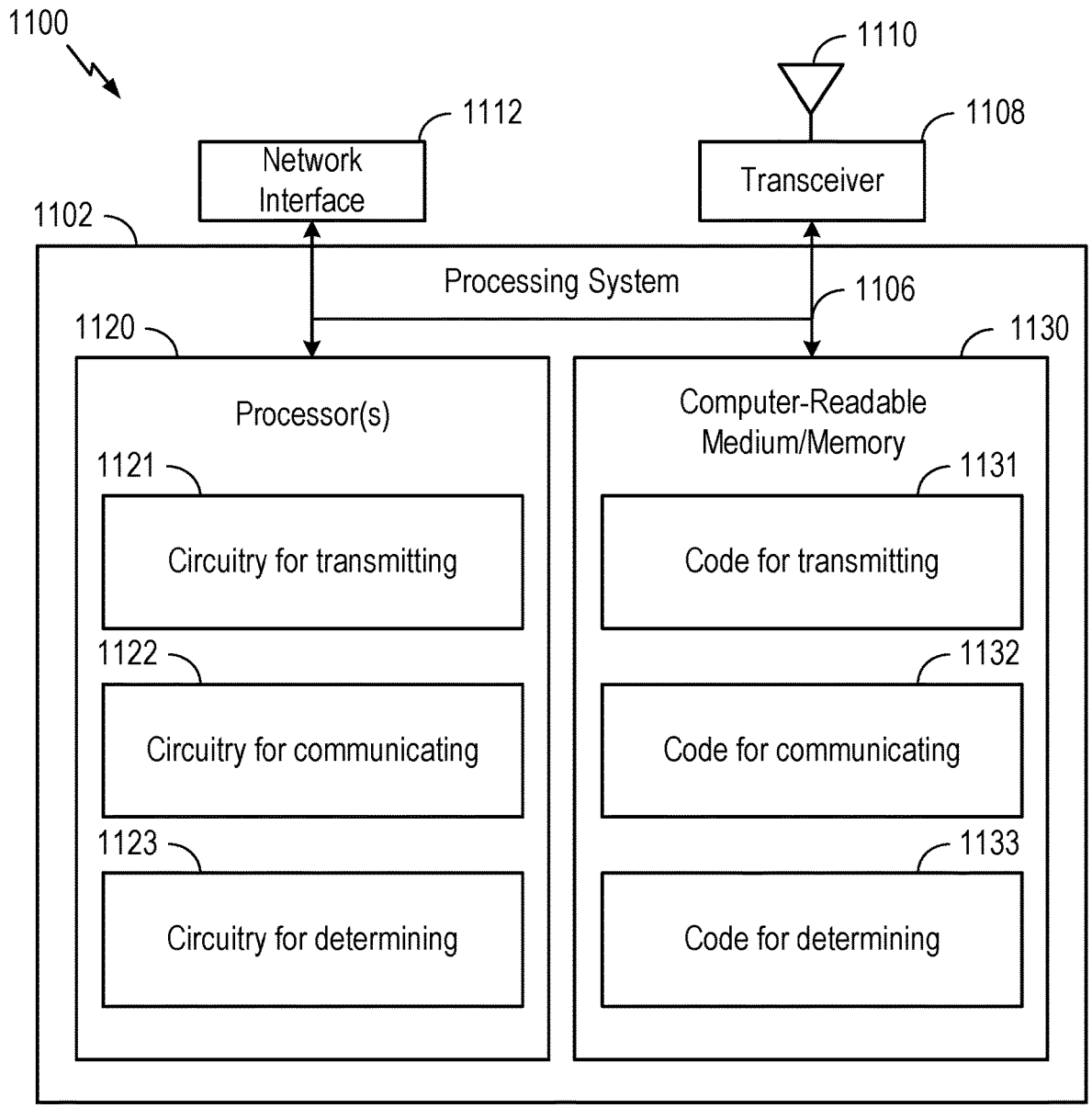
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communication Devices

FIG. 10 depicts aspects of an example communications device 1000. In some aspects, communications device 1000 is a user equipment, such as UE 104 described above with respect to FIGS. 1 and 3.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 358, transmit processor 364, TX MIMO processor 366, and/or controller/processor 380, as described with respect to FIG. 3. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000.

In the depicted example, computer-readable medium/memory 1030 stores code (e.g., executable instructions) for receiving 1031, code for communicating 1032, code for determining 1033, code for using 1034, and code for discarding 1035. Processing of the code 1031-1035 may cause the communications device 1000 to perform the method 800 described with respect to FIG. 8, or any aspect related to it.

The one or more processors 1020 include circuitry configured to implement (e.g., execute) the code stored in the computer-readable medium/memory 1030, including circuitry for receiving 1021, circuitry for communicating 1022, circuitry for determining 1023, circuitry for using 1024, and circuitry for discarding 1025. Processing with circuitry 1021-1025 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, communicating, sending or outputting for transmission may include the transceivers 354 and/or antenna(s) 352 of the UE 104 illustrated in FIG. 3 and/or transceiver 1008 and antenna 1010 of the communications device 1000 in FIG. 10. Means for receiving or obtaining may include the transceivers 354 and/or antenna(s) 352 of the UE 104 illustrated in FIG. 3 and/or transceiver 1008 and antenna 1010 of the communications device 1000 in FIG. 10. Means for using, means for determining, and means for discarding may include one or more processors, such as the controller/processor 380, the transmit processor 364, the receive processor 358, or other processors of the UE 104 illustrated in FIG. 3

FIG. 11 depicts aspects of an example communications device. In some aspects, communications device 1100 is a network entity, such as BS 102 of FIGS. 1 and 3, or a disaggregated base station as discussed with respect to FIG. 2.

The communications device 1100 includes a processing system 1102 coupled to a transceiver 1108 (e.g., a transmitter and/or a receiver) and/or a network interface 1112. The transceiver 1108 is configured to transmit and receive signals for the communications device 1100 via an antenna 1110, such as the various signals as described herein. The network interface 1112 is configured to obtain and send signals for the communications device 1100 via communications link(s), such as a backhaul link, midhaul link, and/or fronthaul link as described herein, such as with respect to FIG. 2. The processing system 1102 may be configured to perform processing functions for the communications device 1100, including processing signals received and/or to be transmitted by the communications device 1100.

The processing system 1102 includes one or more processors 1120. In various aspects, one or more processors 1120 may be representative of one or more of receive processor 338, transmit processor 320, TX MIMO processor 330, and/or controller/processor 340, as described with respect to FIG. 3. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 900 described with respect to FIG. 9, or any aspect related to it. Note that reference to a processor of communications device 1100 performing a function may include one or more processors of communications device 1100 performing that function.

In the depicted example, the computer-readable medium/memory 1130 stores code (e.g., executable instructions) for transmitting 1131, code for communicating 1132, and code for determining 1133. Processing of the code 1131-1133 may cause the communications device 1100 to perform the method 900 described with respect to FIG. 9, or any aspect related to it.

The one or more processors 1120 include circuitry configured to implement (e.g., execute) the code stored in the computer-readable medium/memory 1130, including circuitry for transmitting 1121, circuitry for communicating 1122, and circuitry for determining 1123. Processing with circuitry 1121-1123 may cause the communications device 1100 to perform the method 900 as described with respect to FIG. 9, or any aspect related to it.

Various components of the communications device 1100 may provide means for performing the method 900 as described with respect to FIG. 9, or any aspect related to it. Means for transmitting, sending or outputting for transmission may include the transceivers 332 and/or antenna(s) 334 of the BS 102 illustrated in FIG. 3 and/or transceiver 1108 and antenna 1110 of the communications device 1100 in FIG. 11. Means for receiving or obtaining may include the transceivers 332 and/or antenna(s) 334 of the BS 102 illustrated in FIG. 3 and/or transceiver 1108 and antenna 1110 of the communications device 1100 in FIG. 11. Means for determining include one or more processors, such as the controller/processor 340, the transmit processor 320, the receive processor 338, or other processors of the BS 102 illustrated in FIG. 3

EXAMPLE CLAUSES

Implementation examples are described in the following numbered clauses:

Clause 1: A performed by a user equipment (UE), for wireless communication, comprising: receiving a downlink control information (DCI) message scheduling a plurality of transmissions in a plurality of different slots, wherein: a first set of transmissions of the plurality of transmissions in a first set of slots of the plurality of different slots collide with a corresponding second set of transmissions previously scheduled within the first set of slots, the DCI message includes at least a first field comprising a first plurality of values, each different value in the first plurality of values corresponds to a different transmission in the plurality of transmissions, and a number of values of the first plurality of values is equal to a number of transmissions in the plurality of transmissions; and communicating a third set of transmissions of the plurality of transmissions that do not collide with the second set of transmissions previously scheduled within the first set of slots.

Clause 2: The method of Clause 1, wherein: the DCI message includes at least a second field comprising a second plurality of values, each different value in the second plurality of values corresponds to a different transmission in the plurality of transmissions, and a number of values of the second plurality of values is equal to the number of transmissions in the plurality of transmissions.

Clause 3: The method of any one of Clauses 1-2, wherein: the first field comprises a new data indicator (NDI) field and the second field comprises a redundancy version (RV) field, the first plurality of values comprises a plurality of different NDI values, each different NDI value corresponding to a different transmission in the plurality of transmissions, and the second plurality of values comprises a plurality of different RV values, each different RV value corresponding to a different transmission in the plurality of transmissions.

Clause 4: The method of any one of Clauses 1-3, further comprising determining: a first set of different NDI values from the plurality of different NDI values corresponding to the third set of transmissions that do not collide with the second set of transmissions previously scheduled within the first set of slots; a second set of different NDI values from the plurality of different NDI values corresponding to the first set of transmissions that collide with the second set of transmissions previously scheduled within the first set of slots; a third set of different RV values from the plurality of different RV values corresponding to the third set of transmissions that do not collide with the second set of transmissions previously scheduled within the first set of slots; and a fourth set of different RV values from the plurality of different RV values corresponding to the first set of transmissions that collide with the second set of transmissions previously scheduled within the first set of slots.

Clause 5: The method of any of Clauses 1-4, wherein communicating the third set of transmissions comprises: using the first set of different NDI values and the third set of different RV values to communicate the third set of transmissions, and discarding the second set of different NDI values and the fourth set of different RV values corresponding to the first set of transmissions that collide with the second set of transmissions previously scheduled within the first set of slots.

Clause 6: The method of any of Clauses 1-5, wherein: determining the first set of different NDI values and the second set of different NDI values depends on bit positions of the different NDI values of the plurality of different NDI values within the NDI field, and the bit positions of the different NDI values within the NDI field are based on the first set of transmissions of the plurality of transmissions that collide with the corresponding second set of transmissions.

Clause 7: The method of any of Clauses 1-6, wherein: the bit positions, within the NDI field, of the different NDI values corresponding to the first set of transmissions of the plurality of transmissions occur after the bit positions, within the NDI field, of the different NDI values corresponding to the third set of transmissions of the plurality of transmissions, the first set of different NDI values include the different NDI values within the bit positions of the NDI field corresponding to the third set of transmissions of the plurality of transmissions, and the second set of different NDI values include the different NDI values within the bit positions of the NDI field corresponding to the first set of transmissions of the plurality of transmissions.

Clause 8: The method of any of Clauses 1-7, wherein: bit positions, within the NDI field, of the different NDI values corresponding to the first set of transmissions of the plurality of transmissions and the third set of transmissions of the plurality of transmissions occur in numerical order of the plurality of transmissions, the first set of different NDI values include the different NDI values within the bit positions of the NDI field corresponding to the third set of transmissions of the plurality of transmissions, and the second set of different NDI values include the different NDI values within the bit positions of the NDI field corresponding to the first set of transmissions of the plurality of transmissions.

Clause 9: The method of any of Clauses 1-8, wherein: determining the third set of different RV values and the fourth set of different RV values depends on bit positions of the different RV values of the plurality of different RV values within the RV field, and the bit positions of the different RV values within the RV field are based on the first set of transmissions of the plurality of transmissions that collide with the corresponding second set of transmissions.

Clause 10: The method of any of Clauses 1-9, wherein: the bit positions, within the RV field, of the different RV values corresponding to the first set of transmissions of the plurality of transmissions occur after the bit positions, within the RV field, of the different RV values corresponding to the third set of transmissions of the plurality of transmissions, the third set of different RV values include the different RV values within the bit positions of the RV field corresponding to the third set of transmissions of the plurality of transmissions, and the fourth set of different RV values include the different RV values within the bit positions of the RV field corresponding to the first set of transmissions of the plurality of transmissions.

Clause 11: The method of any of Clauses 1-10, wherein: bit positions, within the RV field, of the different RV values corresponding to the first set of transmissions of the plurality of transmissions and the third set of transmissions of the plurality of transmissions occur in numerical order of the plurality of transmissions, the third set of different RV values include the different RV values within the bit positions of the RV field corresponding to the third set of transmissions of the plurality of transmissions, and the fourth set of different RV values include the different RV values within the bit positions of the RV field corresponding to the first set of transmissions of the plurality of transmissions.

Claims 12: A method, performed by a network entity, for wireless communication, comprising: transmitting a downlink control information (DCI) message scheduling a plurality of transmissions in a plurality of different slots, wherein: a first set of transmissions of the plurality of transmissions in a first set of slots of the plurality of different slots collide with a corresponding second set of transmissions previously scheduled within the first set of slots, the DCI message includes at least a first field comprising a first plurality of values, each different value in the first plurality of values corresponds to a different transmission in the plurality of transmissions, and a number of values of the first plurality of values is equal to a number of transmissions in the plurality of transmissions; and communicating a third set of transmissions of the plurality of transmissions that do not collide with the second set of transmissions previously scheduled within the first set of slots.

Clause 13: The method of Clause 12, wherein: the DCI message includes at least a second field comprising a second plurality of values, each different value in the second plurality of values corresponds to a different transmission in the plurality of transmissions, and a number of values of the second plurality of values is equal to the number of transmissions in the plurality of transmissions.

Clause 14: The method of any of Clauses 12-13, wherein: the first field comprises a new data indicator (NDI) field and the second field comprises a redundancy version (RV) field, the first plurality of values comprises a plurality of different NDI values, each different NDI value corresponding to a different transmission in the plurality of transmissions, and the second plurality of values comprises a plurality of different RV values, each different RV value corresponding to a different transmission in the plurality of transmissions.

Clause 15: The method of any of Clause 12-14, further comprising determining: a first set of different NDI values from the plurality of different NDI values corresponding to the third set of transmissions that do not collide with the second set of transmissions previously scheduled within the first set of slots; a second set of different NDI values from the plurality of different NDI values corresponding to the first set of transmissions that collide with the second set of transmissions previously scheduled within the first set of slots; a third set of different RV values from the plurality of different RV values corresponding to the third set of transmissions that do not collide with the second set of transmissions previously scheduled within the first set of slots; and a fourth set of different RV values from the plurality of different RV values corresponding to the first set of transmissions that collide with the second set of transmissions previously scheduled within the first set of slots.

Clause 16: The method of any of Clauses 12-15, wherein: determining the first set of different NDI values and the second set of different NDI values depends on bit positions of the different NDI values of the plurality of different NDI values within the NDI field, and the bit positions of the different NDI values within the NDI field are based on the first set of transmissions of the plurality of transmissions that collide with the corresponding second set of transmissions.

Clause 17: The method of any of Clauses 12-16 wherein: the bit positions, within the NDI field, of the different NDI values corresponding to the first set of transmissions of the plurality of transmissions occur after the bit positions, within the NDI field, of the different NDI values corresponding to the third set of transmissions of the plurality of transmissions, the first set of different NDI values include the different NDI values within the bit positions of the NDI field corresponding to the third set of transmissions of the plurality of transmissions, and the second set of different NDI values include the different NDI values within the bit positions of the NDI field corresponding to the first set of transmissions of the plurality of transmissions.

Clause 18: The method of any of Clauses 12-17, wherein: bit positions, within the NDI field, of the different NDI values corresponding to the first set of transmissions of the plurality of transmissions and the third set of transmissions of the plurality of transmissions occur in numerical order of the plurality of transmissions, the first set of different NDI values include the different NDI values within the bit positions of the NDI field corresponding to the third set of transmissions of the plurality of transmissions, and the second set of different NDI values include the different NDI values within the bit positions of the NDI field corresponding to the first set of transmissions of the plurality of transmissions.

Clause 19: The method of any of Clauses 12-18, wherein: determining the third set of different RV values and the fourth set of different RV values depends on bit positions of the different RV values of the plurality of different RV values within the RV field, and the bit positions of the different RV values within the RV field are based on the first set of transmissions of the plurality of transmissions that collide with the corresponding second set of transmissions.

Clause 20: The method of any of Clauses 12-19, wherein: the bit positions, within the RV field, of the different RV values corresponding to the first set of transmissions of the plurality of transmissions occur after the bit positions, within the RV field, of the different RV values corresponding to the third set of transmissions of the plurality of transmissions, the third set of different RV values include the different RV values within the bit positions of the RV field corresponding to the third set of transmissions of the plurality of transmissions, and the fourth set of different RV values include the different RV values within the bit positions of the RV field corresponding to the first set of transmissions of the plurality of transmissions.

Clause 21: The method of any of Clauses 12-20, wherein: bit positions, within the RV field, of the different RV values corresponding to the first set of transmissions of the plurality of transmissions and the third set of transmissions of the plurality of transmissions occur in numerical order of the plurality of transmissions, the third set of different RV values include the different RV values within the bit positions of the RV field corresponding to the third set of transmissions of the plurality of transmissions, and the fourth set of different RV values include the different RV values within the bit positions of the RV field corresponding to the first set of transmissions of the plurality of transmissions.

Clause 22: An apparatus, comprising: a memory comprising computer-executable instructions; and one or more processors configured to execute the computer-executable instructions and cause the apparatus to perform a method in accordance with any one of Clauses 1-21.

Clause 23: An apparatus/processing system, comprising means for performing a method in accordance with any one of Clauses 1-21.

Clause 24: A non-transitory computer-readable medium comprising computer-executable instructions that, when executed by one or more processors of an apparatus, cause the apparatus to perform a method in accordance with any one of Clauses 1-21.

Clause 25: A computer program product embodied on a computer-readable storage medium comprising code for performing a method in accordance with any one of Clauses 1-21.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, performed by a user equipment (UE), for wireless communication, comprising:
receiving a downlink control information (DCI) message scheduling a plurality of transmissions in a plurality of different slots, wherein:
a first set of transmissions of the plurality of transmissions in a first set of slots of the plurality of different slots overlap with a corresponding second set of transmissions scheduled within the first set of slots,
the DCI message includes a new data indicator (NDI) field comprising a first plurality of NDI bits and a redundancy version (RV) field comprising a second plurality of RV bits,
each different NDI bit in the first plurality of NDI bits corresponds to a different scheduled transmission in the plurality of transmissions,
each different RV bit in the second plurality of RV bits corresponds to a different scheduled transmission in the plurality of transmissions, and
a number of bits of the first plurality of NDI bits and a number of bits of the second plurality of RV bits are equal to a number of scheduled transmissions in the plurality of transmissions; and
communicating a third set of transmissions of the plurality of transmissions that do not overlap with the second set of transmissions scheduled within the first set of slots.

2. The method of claim 1, wherein an ordering of the different NDI bits within the NDI field of the DCI message corresponds to an ordering of the plurality of transmissions.

3. The method of claim 2, wherein the ordering of the plurality of transmissions is indicated based on information included in a time domain resource allocation (TDRA) field of the DCI message.

4. The method of claim 3, wherein the information included in the TDRA field that indicates the ordering of the plurality of transmissions comprises one or more start and length indicator vectors (SLIVs).

5. The method of claim 1, wherein an ordering of the different RV bits within the RV field of the DCI message corresponds to an ordering of the plurality of transmissions.

6. The method of claim 5, wherein the ordering of the plurality of transmissions is indicated based on information included in a time domain resource allocation (TDRA) field of the DCI message.

7. The method of claim 6, wherein the information included in the TDRA field that indicates the ordering of the plurality of transmissions comprises one or more start and length indicator vectors (SLIVs).

8. A method, performed by a network entity, for wireless communication, comprising:
transmitting a downlink control information (DCI) message scheduling a plurality of transmissions in a plurality of different slots, wherein:
a first set of transmissions of the plurality of transmissions in a first set of slots of the plurality of different slots overlap with a corresponding second set of transmissions scheduled within the first set of slots,
the DCI message includes a new data indicator (NDI) field comprising a first plurality of NDI bits and a redundancy version (RV) field comprising a second plurality of RV bits,
each different NDI bit in the first plurality of NDI bits corresponds to a different scheduled transmission in the plurality of transmissions,
each different RV bit in the second plurality of RV bits corresponds to a different scheduled transmission in the plurality of transmissions, and
a number of bits of the first plurality of NDI bits and a number of bits of the second plurality of RV bits are equal to a number of scheduled transmissions in the plurality of transmissions; and
communicating a third set of transmissions of the plurality of transmissions that do not overlap with the second set of transmissions scheduled within the first set of slots.

9. The method of claim 8, wherein an ordering of the different NDI bits within the NDI field of the DCI message corresponds to an ordering of the plurality of transmissions.

10. The method of claim 9, wherein the ordering of the plurality of transmissions is indicated based on information included in a time domain resource allocation (TDRA) field of the DCI message.

11. The method of claim 10, wherein the information included in the TDRA field that indicates the ordering of the plurality of transmissions comprises one or more start and length indicator vectors (SLIVs).

12. The method of claim 8, wherein an ordering of the different RV bits within the RV field of the DCI message corresponds to an ordering of the plurality of transmissions.

13. The method of claim 12, wherein the ordering of the plurality of transmissions is indicated based on information included in a time domain resource allocation (TDRA) field of the DCI message.

14. The method of claim 13, wherein the information included in the TDRA field that indicates the ordering of the plurality of transmissions comprises one or more start and length indicator vectors (SLIVs).

15. A user equipment (UE), comprising:
a memory comprising computer-executable instructions; and
one or more processors configured to execute the computer-executable instructions and cause the UE to:
receive a downlink control information (DCI) message scheduling a plurality of transmissions in a plurality of different slots, wherein:
a first set of transmissions of the plurality of transmissions in a first set of slots of the plurality of different slots overlap with a corresponding second set of transmissions scheduled within the first set of slots,
the DCI message includes a new data indicator (NDI) field comprising a first plurality of NDI bits and a redundancy version (RV) field comprising a second plurality of RV bits,
each different NDI bit in the first plurality of NDI bits corresponds to a different scheduled transmission in the plurality of transmissions,
each different RV bit in the second plurality of RV bits corresponds to a different scheduled transmission in the plurality of transmissions, and
a number of bits of the first plurality of NDI bits and a number of bits of the second plurality of RV bits are equal to a number of scheduled transmissions in the plurality of transmissions; and communicate a third set of transmissions of the plurality of transmissions that do not overlap with the second set of transmissions scheduled within the first set of slots.

16. The UE of claim 15, wherein an ordering of the different NDI bits within the NDI field of the DCI message corresponds to an ordering of the plurality of transmissions.

17. The UE of claim 16, wherein the ordering of the plurality of transmissions is indicated based on information included in a time domain resource allocation (TDRA) field of the DCI message.

18. The UE of claim 17, wherein the information included in the TDRA field that indicates the ordering of the plurality of transmissions comprises one or more start and length indicator vectors (SLIVs).

19. The UE of claim 15, wherein an ordering of the different RV bits within the RV field of the DCI message corresponds to an ordering of the plurality of transmissions.

20. The UE of claim 19, wherein the ordering of the plurality of transmissions is indicated based on information included in a time domain resource allocation (TDRA) field of the DCI message.

21. The UE of claim 20, wherein the information included in the TDRA field that indicates the ordering of the plurality of transmissions comprises one or more start and length indicator vectors (SLIVs).

22. A network entity, comprising:
a memory comprising computer-executable instructions; and
one or more processors configured to execute the computer-executable instructions and cause the network entity to:
transmit a downlink control information (DCI) message scheduling a plurality of transmissions in a plurality of different slots, wherein:
a first set of transmissions of the plurality of transmissions in a first set of slots of the plurality of different slots overlap with a corresponding second set of transmissions scheduled within the first set of slots,
the DCI message includes a new data indicator (NDI) field comprising a first plurality of NDI bits and a redundancy version (RV) field comprising a second plurality of RV bits,
each different NDI bit in the first plurality of NDI bits corresponds to a different scheduled transmission in the plurality of transmissions,
each different RV bit in the second plurality of RV bits corresponds to a different scheduled transmission in the plurality of transmissions, and
a number of bits of the first plurality of NDI bits and a number of bits of the second plurality of RV bits are equal to a number of scheduled transmissions in the plurality of transmissions; and
communicate a third set of transmissions of the plurality of transmissions that do not overlap with the second set of transmissions scheduled within the first set of slots.

23. The network entity of claim 22, wherein an ordering of the different NDI bits within the NDI field of the DCI message corresponds to an ordering of the plurality of transmissions.

24. The network entity of claim 23, wherein the ordering of the plurality of transmissions is indicated based on information included in a time domain resource allocation (TDRA) field of the DCI message.

25. The network entity of claim 24, wherein the information included in the TDRA field that indicates the ordering of the plurality of transmissions comprises one or more start and length indicator vectors (SLIVs).

26. The network entity of claim 22, wherein an ordering of the different RV bits within the RV field of the DCI message corresponds to an ordering of the plurality of transmissions.

27. The network entity of claim 26, wherein the ordering of the plurality of transmissions is indicated based on information included in a time domain resource allocation (TDRA) field of the DCI message.

28. The network entity of claim 27, wherein the information included in the TDRA field that indicates the ordering of the plurality of transmissions comprises one or more start and length indicator vectors (SLIVs).

* * * * *